United States Patent
Ambilkar et al.

(10) Patent No.: US 7,953,122 B2
(45) Date of Patent: May 31, 2011

(54) TRANSPORT BITSTREAM SYNCHRONIZATION

(75) Inventors: Shridhar Narasimha Ambilkar, Bangalore (IN); Girish Gopala Kurup, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 12/180,009

(22) Filed: Jul. 25, 2008

(65) Prior Publication Data

US 2010/0020830 A1 Jan. 28, 2010

(51) Int. Cl.
*H04J 3/06* (2006.01)
(52) U.S. Cl. .......................................... 370/503
(58) Field of Classification Search .......... 370/503–520; 375/354–376
See application file for complete search history.

(56) References Cited

U.S. PATENT DOCUMENTS

| | | | | |
|---|---|---|---|---|
| 4,479,230 A * | 10/1984 | Auzet et al. ................. | 375/357 |
| 5,272,694 A * | 12/1993 | Bourgart et al. .............. | 370/296 |
| 5,539,751 A * | 7/1996 | Sabel ......................... | 370/514 |
| 5,671,227 A * | 9/1997 | Keller et al. ................. | 370/509 |
| 5,887,039 A | 3/1999 | Suemura et al. | |
| 5,914,962 A | 6/1999 | Fimoff et al. | |
| 5,920,572 A | 7/1999 | Washington et al. | |
| 5,949,834 A * | 9/1999 | Laud et al. .................... | 375/368 |
| 6,154,468 A * | 11/2000 | Lin et al. ....................... | 370/510 |
| 6,298,387 B1 * | 10/2001 | Prasad et al. .................. | 709/236 |
| 6,744,782 B1 | 6/2004 | Itakura et al. | |
| 2004/0151262 A1 * | 8/2004 | Hammes et al. .............. | 375/343 |
| 2004/0234019 A1 | 11/2004 | Kim et al. | |
| 2006/0209709 A1 | 9/2006 | Kovacevic | |

* cited by examiner

*Primary Examiner* — Kwang B Yao
*Assistant Examiner* — Kenan Cehic
(74) *Attorney, Agent, or Firm* — Sprusons and Ferguson; Grant A. Johnson

(57) ABSTRACT

Disclosed is a method for synchronizing a bitstream, the method comprising comparing an incoming data byte of the bitstream with a predetermined byte pattern; writing a result of the comparison to a current write address in a FIFO; calculating a difference between a current read address in the FIFO and the current write address; asserting a synchronization signal when the difference equals a predetermined value; the result of the comparison is asserted; and an output of the FIFO at the current read address is asserted.

8 Claims, 3 Drawing Sheets

TRANSPORT BITSTREAM SYNCHRONIZATION

FIELD OF THE INVENTION

This invention relates generally to data communication and, in particular, to the detection of synchronization patterns in a transport packet bitstream.

BACKGROUND

Packets in a bitstream are often delineated by the appearance therein of a particular data value, e.g. a particular 8-bit wide (byte or octet) data pattern, which is termed the "synchronization pattern". For example, according to the MPEG-2 standard used for Digital Video Broadcasting (DVB), the 8-bit value used for the synchronization pattern of the transport bitstream is 0x47 (01000111). The transport bitstream is based upon packets of constant size so that adding error-correction codes and interleaving in a higher layer is eased. The format of a transport packet is illustrated in FIG. 1a. The transport packet 100 is typically 188 bytes long, beginning with a 4-byte header 10, with the remaining 184 bytes known as the payload. The first byte 120 of the header 10 is the synchronization byte, typically also referred to as the sync byte, which has a synchronization pattern 0x47. The remaining three bytes of the header are for other purposes.

DVB decoder systems have an interface to a tuner circuit that is typically 8-bit parallel. The tuner drives the data along with a clock and data valid signal that is used by the DVB system. The incoming data into the DVB system is asynchronous to the DVB system. Because of this, the DVB system needs to establish the packet boundaries within the transport bitstream, a process known as "synchronization". The DVB system can attempt to detect the sync byte to identify the start of a packet, and then place the boundaries at 188-byte intervals starting at the detected sync byte.

However, it can occur in some instances that many of the bytes in the packet, in the header or the payload, are 0x47. FIG. 1b illustrates an example transport bitstream 150 in which many of the bytes are 0x47. Attempting to detect the packet boundaries in bitstream 150 and thus synchronize the tuner, a synchronizer will detect that byte 0 is 0x47, and then count the remaining 187 bytes to find the transport packet boundary at byte 188. If this is the correct boundary, then the second packet would start at byte 188 with a sync byte 0x47 of the second packet. But the data at byte 188 is 0x22, so the first 0x47 that was detected (at byte 0) cannot be the start of a packet. Therefore, the synchronizer needs to detect the next incoming 0x47 byte, which happens to be byte 1. However, the second 0x47 byte (byte 1) is already lost because the synchronizer was counting the incoming data from the initially detected 0x47 byte (byte 0). The synchronizer will be able to detect the next 0x47 only after 188 bytes have been counted. It can occur in some instance that the next detected 0x47 is part of the payload and not the actual sync byte. It may therefore take a long time to synchronize the transport bitstream, within which time incoming data can be lost. In some cases it might happen that synchronization cannot be achieved.

A similar disadvantage exists even if the synchronizer counter is reset when a new 0x47 is received. This will overwrite the previously captured sync position. Again referring to FIG. 1b, starting from position 0, the next 0x47 is detected at byte 1 (which is in fact a sync byte), resetting the counter. Now again at byte 3, 0x47 (which is actually a data byte) is detected, once again resetting the counter. Such a resetting procedure will delay the synchronization process or even fail to achieve synchronization.

To achieve fast synchronization, it is necessary to detect occurrences of 0x47 separated by 188 bytes (pairs of sync bytes). A counter has to be started when each 0x47 is detected and the 189th byte checked to see whether it is 0x47 or not. Repeating this exercise for each and every occurrence of 0x47 is difficult and cumbersome to implement in hardware, especially where a continuous flow of data exists. Conventional hardware solutions store 188 bytes at a time in a buffer and then compare the incoming byte with the oldest stored byte to detect the presence of a pair of sync bytes in the data bitstream continuously. A disadvantage with this approach is that it uses a large amount of memory. The buffer may not be used in actual packet processing once the sync pair is detected. In applications where the synchronization is to be implemented in a field programmable gate array (FPGA), the conventional solution is impractical, since FPGAs have strictly limited internal memory.

SUMMARY

It is an object of the present invention to substantially overcome, or at least ameliorate, one or more disadvantages associated with the existing arrangements.

Disclosed are arrangements for synchronizing a transport bitstream which seek to address the above problems by using a FIFO of depth at least 189 and width one bit. Stored in this FIFO is one bit for each of at least 189 successive bytes, each bit being the output of a comparison with the predetermined sync byte. A synchronization signal is asserted when two set bits with addresses differing by 188 are found in the FIFO. The disclosed arrangement either uses far lesser memory than conventional hardware sychronizers, or takes less time to achieve synchronization.

According to a first aspect of the present invention, there is provided a method for synchronizing a bitstream. An incoming data byte of the bitstream is compared with a predetermined byte pattern, and results of the comparison are written to a current write address in a FIFO. A difference is calculated between a current read address in the FIFO and the current write address, and a synchronization signal is asserted when the difference equals a predetermined value. Finally results of the comparison are asserted, and an output of the FIFO at the current read address is asserted.

According to a further aspect of the present invention, there is provided an apparatus for synchronizing a bitstream, the apparatus is provided with a first comparator adapted to compare an incoming data byte of the bitstream with a predetermined byte pattern; a FIFO to which the output of the comparator is written at a current write address; a circuit adapted to calculate a difference between a current read address in the FIFO and the current write address; a second comparator adapted to compare the difference with a predetermined value; a logic gate adapted to assert a synchronization signal when the result of each the comparator is asserted; and an output of the FIFO at the current read address is asserted.

Other aspects of the invention are also disclosed.

BRIEF DESCRIPTION OF THE DRAWINGS

Some aspects of the prior art and one or more embodiments of the present invention will now be described with reference to the drawings, in which.

DETAILED DESCRIPTION INCLUDING BEST MODE

Figure 1A:
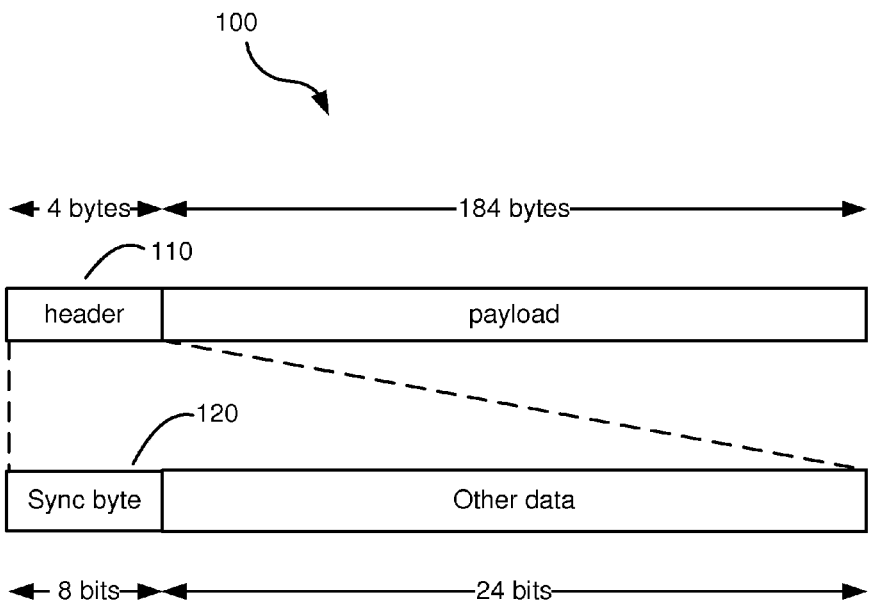
FIG. 1a illustrates the structure of a transport packet in a DVB transport bitstream.
Figure 1B:
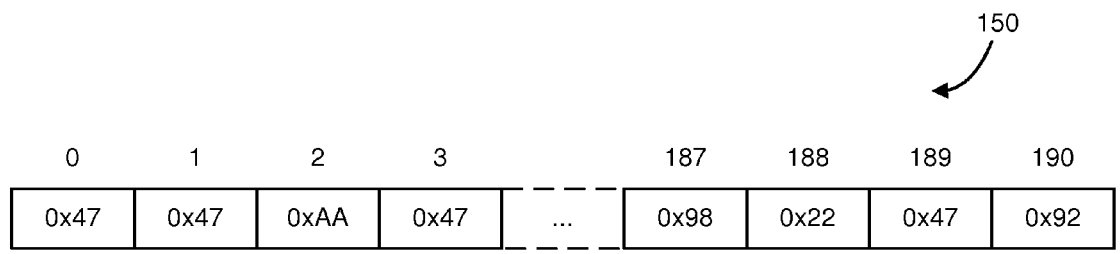
FIG. 1b shows an example transport bitstream comprising a series of bytes.

Where reference is made in any one or more of the accompanying drawings to steps and/or features, which have the same reference numerals, those steps and/or features have for the purposes of this description the same function(s) or operation(s), unless the contrary intention appears.

Figure 2:
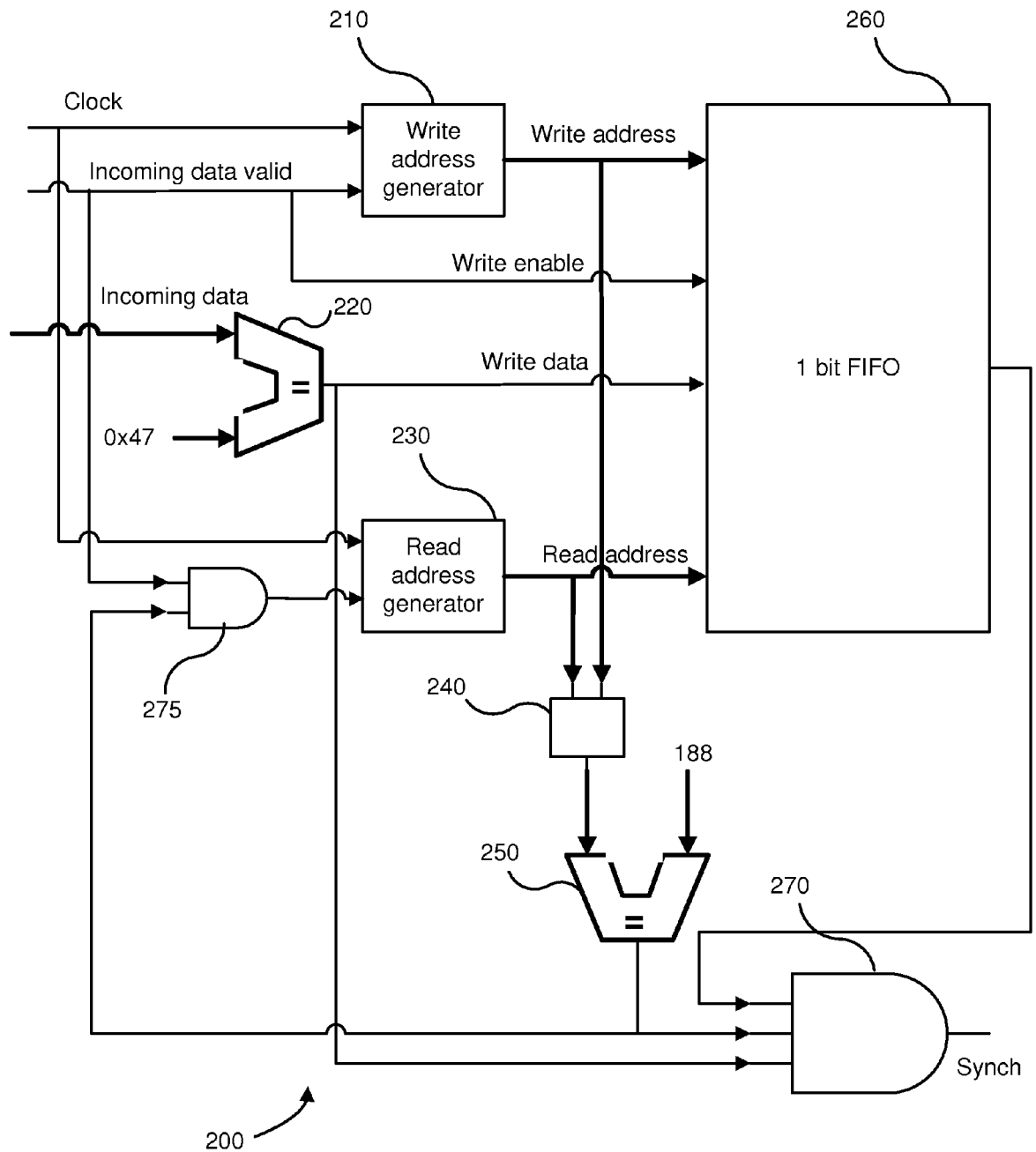
FIG. 2 shows a circuit for synchronizing a transport bitstream according to an embodiment of the present invention.

FIG. 2 shows a circuit 200 for synchronizing a transport bitstream according to an embodiment of the claimed invention. The circuit 200 is preferably implemented as dedicated logic within an FPGA. The write address generator 210 and the read address generator 230 are essentially counters that increment their respective addresses when their clock input is pulsed. Address "wrap-around" occurs when an address whose bits are all equal to 1, thus having reached the limit of the address space, is incremented to become all zeros. Both address generators 210 and 230 are initialised to zero at reset.

The incoming data, having a width of 8 bits, from a DVB tuner (not shown) is compared by comparator 220 with the sync byte 0x47, giving a 1-bit result that is asserted (1) if the incoming data byte is equal to 0x47, and de-asserted (0) otherwise. The tuner clock pulses the write address generator 210 to increment the write address, provided incoming data from the tuner is valid, as indicated by the "incoming data valid" signal being asserted. The write address is incremented after performing the write.

The 1-bit output of comparator 220 is written to the FIFO 260 at the address generated by the write address generator 210. The "incoming data valid" signal is also used as a write enable input for the FIFO 260. The output of FIFO 260 is read from the read address generated by the Read Address Generator 230, which at first remains de-asserted at zero. The read address is subtracted from the write address by circuit 240, which is described in more detail below. Once the output of circuit 240 reaches 188, as indicated by an asserted output from comparator 250, and there is a valid write to the FIFO 260, as indicated by an asserted write enable input to the FIFO 260, the read address generator 230 is enabled via an asserted output from the AND gate 275, and is pulsed by the tuner clock to increment the read address. The read address is incremented only when there is a valid write to the FIFO 260 to make sure that the READ and WRITE addresses differ by 188 locations. The write address and read address thereafter maintain a constant difference of 188, so the middle input to the AND gate 270 remains asserted. The other two inputs to the AND gate 270 are the data written to the FIFO 260 (i.e. the output of comparator 220) at the current write address, and the data read from the FIFO 260 at the current read address. When these two signals, along with the comparator 250 output, are both 1, indicating two bytes in the transport bitstream separated by 188 bytes are equal to 0x47, the "synch" signal at the output of AND gate 270 is asserted, indicating synchronization has been detected.

As explained above, the read address generator 230 begins incrementing the read address only if the difference between the write address and the read address is 188 and a valid write happens to the FIFO 260. The difference between the read and write address remains 188 as long as the write address does not wrap around.

Usually the FIFO depth is of 2 to the power n, where n is the number of address bits to the FIFO. In this application, the packet length is 188 bytes, so the depth of the FIFO is preferably 256 (2 to the power of 8), which is nearest to, yet greater than, 188. To address a 256 byte deep FIFO, 8 bits of read/write address are needed.

At reset, both read and write addresses are pointing to location 0. Whenever a new incoming byte from the tuner is received, it is written to the FIFO 260 at location 0 and the write address is incremented to point to location 1. The read address points to location 0 until the FIFO has 188 entries written to it. At this time, the write address is 188 and the difference between read and write addresses is 188.

With this condition (the difference between the read and write addresses being 188), the read address starts incrementing along with the write address for every valid write to the FIFO 260. The difference between read and write addresses remains 188 till the write address reaches 255. The read address is pointing to location 67 when the write address is at 255. At this point, the address being 8 bits (locations 0 to 255), a write to the FIFO 260 wraps the write address to 0, and the read address points to 68. After the write address wraps around, the integer difference between the write address and the read address no longer remains 188 (in fact it is −68). If the circuit 240 does not take account of this, the output of the comparator 250 will not be asserted and the synch output of the AND gate 270 output will be de-asserted.

The requirement on the circuit 240 is therefore that the difference between the read and the write address should be calculated modulo the depth of FIFO 260, so that a positive number is always returned even when either address wraps around zero.

Figure 3:
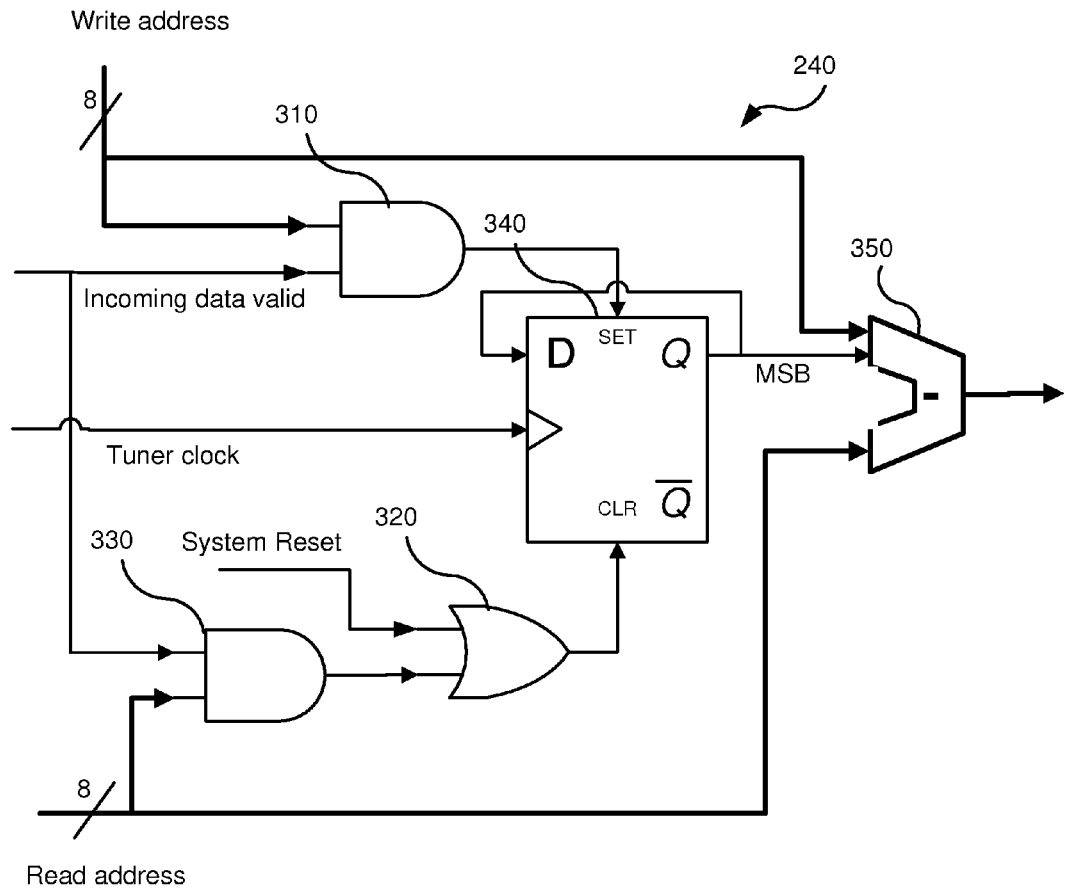
FIG. 3 shows a circuit for subtracting the read address from the write address, as used in the circuit of FIG. 2.

The bitstream synchronization circuit 200 is preferably implemented as an FPGA, which favours a simple solution to finding the modulo 256 difference between the read and write addresses. FIG. 3 shows the circuit 240 for subtracting the read address from the write address in more detail according to one embodiment.

Referring to FIG. 3, at system reset the flip-flop 340 is reset through OR gate 320, so that the output Q is de-asserted (logic zero). The output Q is used as a Most Significant Bit (MSB) to accompany the write address for the subtractor 350 which calculates the difference between the read and write addresses. The output Q is also the D input to the flip-flop 340 to maintain the output every clock cycle.

The flip-flop 340 is SET synchronously when the write address reaches the end of the FIFO 260 and there is a valid write. The write address bits turning out to be all one, means the write address has reached the end of the FIFO 260. The write address reaching the end of the FIFO is detected by ANDing all the write address bits together with the "incoming data valid" signal at AND gate 310. Similarly, the flip-flop 340 is RESET synchronously when the read address reaches the end of the FIFO 260 and there is a valid write. The read address reaching the end of the FIFO 260 is detected by ANDing all the read address bits together with the "incoming data valid" signal at AND gate 330, whose output is passed to the OR gate 320.

With this arrangement, the difference between read and the write addresses is calculated modulo 256, so that the address wrap around will sufficiently ameliorate any foreseen problems.

The detailed operation of the circuit 240 is explained below. The read and the write addresses in this embodiment are 8 bits wide (0 to 255). At system reset, both addresses are zero and hence the difference between them is zero.

As the tuner outputs the bytes, the comparator 220 output bits are written into the FIFO 260 and simultaneously the write address is incremented to point to the next FIFO location. Every write that is performed increases the difference between the read and write addresses. When the $189^{th}$ bit is written to the FIFO, the write address points to location 188. At this time, the difference between the read and the write addresses is 188 as the write address is 188 and the read address is still 0.

Once the difference is 188, the read address is incremented simultaneously with the write address. This makes the difference between them 188 until the write address reaches the end of the FIFO 260, i.e. the write address points to location 255. At this time, the read address points to location 67 and the difference between the address points is 188.

When the write address reaches 255 (all 8 bits are '1'), the flip-flop 340 is SET when there is a valid write to the FIFO 260, and the write address then wraps around to 0. The read address is pointing to location 68 at this time. An integer subtraction will therefore not give a difference of 188 between read and the write addresses.

The flip-flop bit is prepended as an MSB to the write address while calculating the difference at the subtractor 350.

At RESET, the flip-flop bit is zero, so the address difference is effectively taken using only the 8 bits of each address. Once the flip-flop 340 is set, the subtractor 350 sees the write address as 1 0000 0000 (binary), which is 256 in decimal. As mentioned above, the read address is 68 decimal and the integer difference between them is therefore calculated as 188 by the subtractor 350.

The next valid write to the FIFO 260 will increment the 8 bit read and write addresses with the flip-flop 340 in SET condition. Consider the next 5 valid writes to the FIFO 260. The write address points to location 5 and the binary value is 0000 0101. The read address is incremented simultaneously with the write address, and points to location 73. Now, while the subtractor 350 is calculating the difference between the read and write addresses, the flip-flop bit is prepended as the MSB to the write address so the write address is effectively 1 0000 0101 (binary), which is 261 decimal. The integer difference between the write and read addresses is therefore 261−73=188.

The flip-flop 340 is SET until the read address reaches 255. At this time, the write address would have reached 1011 1011 (binary), and is 187 decimal. While the subtractor 350 is calculating the difference, the flip-flop bit is prepended as the MSB to the write address to make it effectively 1 1011 1011 (binary)=443 decimal. The read address is 255, and the integer difference between them is 443−255=188. At this time, the flip-flop 340 is reset when there is a valid write to the FIFO 260, as the read address has reached the end of the FIFO 260.

The next write to the FIFO 260 makes the write address 1011 1100 (binary)=188 decimal, the flip-flop 340 is reset ('0'), and the read address is wrapped around to make it 0. With this, the subtracter 350 sees write address 0 1011 1100 (MSB flip-flop bit reset)=188 decimal, and read address 0, so the integer difference is 188.

The setting of the flip-flop 340 at write address wrap-around and the resetting of the flip-flop 340 at read address wrap-around continues to maintain the subtractor 350 difference at 188.

Once the "synch" signal is asserted, the circuit 200 is disabled, and both the write address and read address are reset to 0. The circuit/logic beyond the circuit 200 monitors the synchronization of the incoming packet bitstream. If synchronization is later lost, the read address generator will be disabled until at least 188 bits are accumulated in the FIFO.

The foregoing describes only some embodiments of the present invention, and modifications and/or changes can be made thereto without departing from the scope and spirit of the invention, the embodiments being illustrative and not restrictive.

We claim:

1. A method for synchronizing a bitstream, the method comprising:
   comparing an incoming data byte of the bitstream with a predetermined byte pattern;
   writing a result of the comparison to a current write address in a FIFO;
   calculating a difference between a current read address in the FIFO and the current write address;
   asserting a synchronization signal when:
      the difference equals a predetermined value;
      the result of the comparison is asserted; and
      an output of the FIFO at the current read address is asserted.

2. The method of claim 1, further comprising incrementing the read address when the difference equals the predetermined value.

3. The method of claim 1, wherein the calculated difference between the current read address in the FIFO and the current write address is further modulo the depth of the FIFO.

4. The method of claim 3, further comprising prepending a most significant bit to the write address before calculating the difference, the most significant bit being set when the write address wraps around and reset when the read address wraps around.

5. Apparatus for synchronizing a bitstream, said apparatus comprising:
   a first comparator adapted to compare an incoming data byte of the bitstream with a predetermined byte pattern;
   a FIFO to which the output of the comparator is written at a current write address;
   a circuit adapted to calculate a difference between a current read address in the FIFO and the current write address;
   a second comparator adapted to compare the difference with a predetermined value;
   a logic gate adapted to assert a synchronization signal when:
      the result of each the comparator is asserted; and
      an output of the FIFO at the current read address is asserted.

6. The apparatus of claim 5, further comprising a read address generator to adapted to increment the read address when the result of the second comparator is asserted.

7. The apparatus of claim 5, wherein the difference calculated by the circuit between the current read address in the FIFO and the current write address is further modulo the depth of the FIFO.

8. The apparatus of claim 5, wherein the circuit is configured to prepend a most significant bit to the write address before calculating said difference, the most significant bit being set when the write address wraps around and reset when the read address wraps around.

* * * * *